(12) United States Patent  
Portnik et al.

(10) Patent No.: US 12,464,483 B2  
(45) Date of Patent: Nov. 4, 2025

(54) ADJUSTMENT OF DOWNLINK RADIO-FRAME TIMING FOR COORDINATED MULTI-POINT RECEPTION BY USER EQUIPMENT IN ADVANCED COMMUNICATION NETWORKS

(71) Applicant: Dell Products L.P., Round Rock, TX (US)

(72) Inventors: Ilya Portnik, Ashton (CA); Eran Goldstein, Montreal (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 420 days.

(21) Appl. No.: 18/155,462

(22) Filed: Jan. 17, 2023

(65) Prior Publication Data

US 2024/0244556 A1   Jul. 18, 2024

(51) Int. Cl.
*H04W 56/00* (2009.01)
*H04W 72/1268* (2023.01)

(52) U.S. Cl.
CPC ..... *H04W 56/005* (2013.01); *H04W 72/1268* (2013.01)

(58) Field of Classification Search
None
See application file for complete search history.

(56) References Cited

U.S. PATENT DOCUMENTS 8,675,482 B1   3/2014   Lu et al.
9,402,255 B2   7/2016   Löhr et al.
(Continued)

FOREIGN PATENT DOCUMENTS

EP   2 391 159 B1   6/2019
EP   2 870 813 B1   6/2021

OTHER PUBLICATIONS

3GPP "5G; NR; Physical channels and modulation (3GPP TS 38.211 version 16.7.0 Release 16)" Oct. 2021, https://www.etsi.org/deliver/, 138 pages.

(Continued)

*Primary Examiner* — Lonnie V Sweet
(74) *Attorney, Agent, or Firm* — Amin, Turocy & Watson, LLP

(57) ABSTRACT

The technology described herein is directed towards aligning the downlink symbol timing boundaries of coordinated multi-point (CoMP) transmitting radio units, so that a user equipment receives transmitted signals from each cell at generally the same time. In a CoMP scenario, synchronized downlink transmissions from a connected cell and a cooperating cell are generally not received at the same time by a target user equipment because of different propagation distances from the transmitting radio units; such misalignment leads to performance degradation. By offsetting the downlink symbol timing boundaries relative to each other, a targeted user equipment receives symbols at the desired time boundary, resulting in constructive interference that improves and a cell's downlink throughput and/or coverage. Time alignment via offset symbol timing boundaries also eliminates inter-symbol interference. Modified scheduling can be used to ensure that downlink and uplink transmissions from the coordinated radio units do not interfere with one another.

20 Claims, 11 Drawing Sheets

(56) References Cited

U.S. PATENT DOCUMENTS

| | | | |
|---|---|---|---|
| 2003/0117980 A1* | 6/2003 | Kim | H04W 36/0094 |
| | | | 370/332 |
| 2005/0120097 A1* | 6/2005 | Walton | H04L 1/0002 |
| | | | 370/345 |
| 2010/0265904 A1* | 10/2010 | Yang | H04L 27/2655 |
| | | | 370/329 |
| 2013/0083780 A1 | 4/2013 | Luo et al. | |
| 2013/0242952 A1 | 9/2013 | Chu | |
| 2014/0140315 A1* | 5/2014 | Kim | H04W 72/1268 |
| | | | 370/329 |
| 2017/0093538 A1 | 3/2017 | Yoon et al. | |
| 2017/0230931 A1* | 8/2017 | Ubeda Castellanos | |
| | | | G01S 5/0218 |
| 2018/0279339 A1* | 9/2018 | Löhr | H04W 72/1268 |
| 2019/0141590 A1* | 5/2019 | Li | H04W 52/245 |
| 2019/0261189 A1* | 8/2019 | Huang | H04W 72/569 |
| 2020/0112953 A1* | 4/2020 | Bendlin | H04W 88/14 |
| 2020/0177287 A1 | 6/2020 | Yu et al. | |
| 2022/0182957 A1* | 6/2022 | Laddu | H04L 5/0094 |
| 2022/0386337 A1* | 12/2022 | Hao | H04L 5/001 |
| 2023/0224839 A1* | 7/2023 | Park | H04W 56/0005 |
| | | | 370/350 |
| 2023/0389015 A1* | 11/2023 | Sandberg | H04W 74/0833 |
| 2023/0422238 A1* | 12/2023 | Kazmi | H04W 72/54 |
| 2024/0137073 A1 | 4/2024 | Wang et al. | |
| 2024/0224206 A1* | 7/2024 | Liu | H04W 56/0015 |
| 2025/0024393 A1* | 1/2025 | Abreu | H04W 56/001 |

OTHER PUBLICATIONS

3GPP "5G; NR; Multiplexing and channel coding (3GPP TS 38.212 version 15.2.0 Release 15)" Jul. 2018, https://www.etsi.org/deliver/etsi_ts/138200_138299/138212/15.02.00_60/ts_138212v150200p.pdf, 101 pages.

3GPP "5G; NR; Physical layer procedures for control (3GPP TS 38.213 version 16.2.0 Release 16)" Jul. 2020, https://www.etsi.org/deliver/etsi_ts/138200_138299/138213/16.02.00_60/ts_138213v160200p.pdf, 180 pages.

International Search Report and Written Opinion received for PCT Application Serial No. PCT/US2023/035957 dated Feb. 22, 2024, 13 pages.

Notice of Allowance received for U.S. Appl. No. 18/185,882 dated May 28, 2025, 9 pages.

International Preliminary Report on Patentability received for PCT Application Serial No. PCT/US2023/035957 dated Jul. 31, 2025, 8 pages.

* cited by examiner

ADJUSTMENT OF DOWNLINK RADIO-FRAME TIMING FOR COORDINATED MULTI-POINT RECEPTION BY USER EQUIPMENT IN ADVANCED COMMUNICATION NETWORKS

BACKGROUND

In coordinated multi-point transmission/reception (COMP) cells can be assigned, including dynamically, to support other cells, via multiple transmission and reception points (mTRP), e.g., to increase the power of received downlink transmissions, corresponding to increased throughput and coverage. In general, with COMP, multiple cells use the same scrambling sequence, whereby a user equipment (UE) perceives the multiple cells as one cell, (in contrast to a UE operating in a dual connectivity mode perceived as two cells). A cell that is assigned to assist the main cell by transmitting an additional downlink signal using the same scrambling sequence is referred to herein as a "cooperating" (or sometimes "assisting" or "supporting") cell, whereas the original cell to which a user equipment (UE) is connected is referred to herein as a "connected" cell.

However, when a cell switches to support and cooperate with another cell, the downlink signals from the two cells are received at the UE at different times. This can result in negative side effects on the UE, lower downlink throughput and lower downlink coverage.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards aligning downlink symbol timing boundaries for transmissions of radio units (RUs, corresponding to cells) to compensate for misalignments at the user equipment (UE) receiving side. The timing alignment reduces or even eliminates the performance degradation in a COMP (coordinated multi-point transmission/reception) scenario by dynamically adjusting downlink symbol timing boundaries such that a targeted UE receives symbols from different TRPs/RUs (transmission and reception points/radio units) at the desired time boundary. As will be understood, this improves the UE's reception and therefore a cell's downlink throughput and/or coverage. Note that as one benefit, the technology described herein does not require a UE to use or support dual connectivity to receive transmissions from the assisting cells, as the signals from multiple cells are perceived to come from a single, connected cell.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
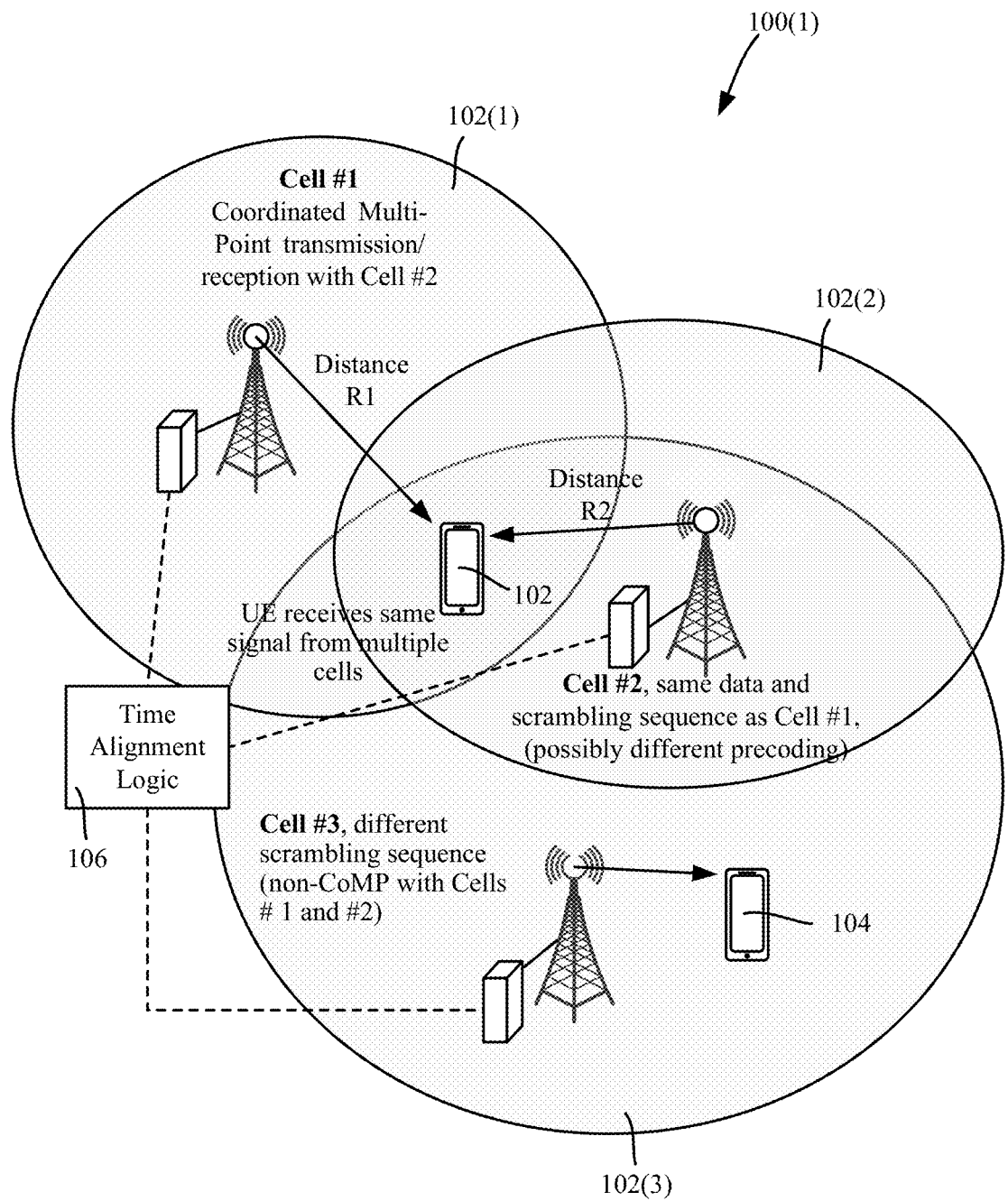
FIG. 1 depicts an example representation of multiple cells, including two cells serving a user equipment in a coordinated multipoint transmission/reception mode based on reception time alignment, in accordance with various aspects and implementations of the subject disclosure.

FIG. 1 is an example representation of a system/architecture 100(1) including three cells 102(1)-102(3) that are configured for COMP; in FIG. 1, cell #1 102(1) is the connected cell with respect to serving the UE 104 via CoMP, and is being assisted by the cell #2 102(2) as the cooperating cell. Thus, cell #1 102(1) and cell #2 by 102(2) are cooperating to provide downlink services to the selected UE 104 with the same scrambling sequence such that the UE 104 perceives the cells as a single downlink data source, generally with improved reception relative to data transmission from a single transmission point. Note that the cell #3 102(2) is not cooperating while in the state depicted in FIG. 1, that is, has a different scrambling sequence/is non-COMP with Cells #1 and #2, and may, for example, be serving the UE 104.

However, with time division duplexing (TDD) in a COMP scenario, the cells are usually synchronized. As a result, received downlink signals suffer a time misalignment based on the difference between the distances of each of the two radio units to the receiving UE, depicted as distances R1 and R2 in FIG. 1. This distance difference corresponds to a time difference ΔT of $$\Delta T = \frac{(R2 - R1)}{C},$$

where C is approximately the speed of light.

When a receiver (the UE 104) experiences multiple signals combined on its antenna ports, the higher the time misalignment between the signals, the shorter the coherent bandwidth to create an effective beam. In other words, the two signals can switch from constructive to destructive interference, and transmission maximum-ratio combining (Tx MRC) is lost. Also, if the signal time misalignment is larger than the cyclic prefix (CP) length, inter-symbol interference (ISI) can occur, further degrading the performance. Still further, the UE's channel estimation performance is degraded due to the receiver assumption that the signals are to arrive with a lower delay spread.

More particularly, when a signal is received at a time misalignment a rapid phase rotation is experienced (in frequency domain) which prevents effective beamforming. For that reason, the third generation partnership project (3GPP) standard mandates that for MIMO transmission, at each carrier frequency, the time alignment error (TAE) is not to exceed 65 nanoseconds. Note that 65 nanoseconds is equivalent to approximately 19.5 meters assuming the speed of light propagation in vacuum, which shows that even a small propagation distance difference can cause beam forming degradation.

As shown in FIG. 1, time alignment logic 106 based on the technology described herein can operate to reduce, or even substantially eliminate, the time alignment error. Note that the time alignment logic 106 can be incorporated into the communications network at the core network, at a centralized unit, at one or more distributed units, within one or more of the cells, and so on.

Note that FIG. 1 shows a connected cell 102(1) and a single cooperating (assisting) cell 102(2). However, this is only one example, and an option is to have more than one cooperating (assisting) cell transmitting to the UEs. For example, the Cell #3 102(3) can, at least part of the time, use the same data and scrambling sequence as the Cell #1 102(1) and thereby act as an assisting cell during that time, in conjunction with the assistance from the Cell #2 102(2). In sum, there can be N assisting cells, (where Nis any practical number), with each one correcting its transmission TX time according to its specific time difference.

Figure 2:
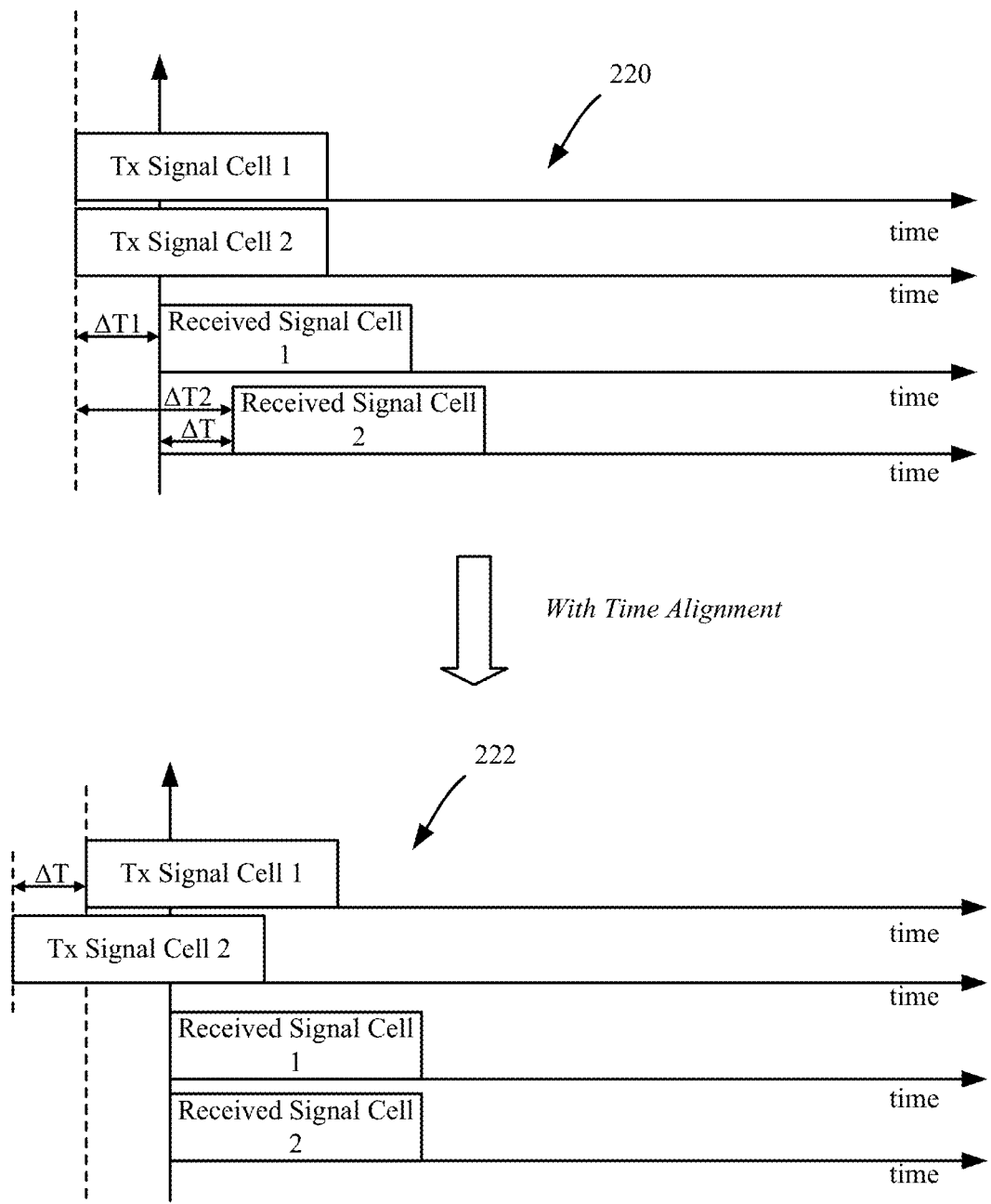
FIG. 2 shows example graphical representations of time alignment of transmissions resulting in reception time misalignment at a UE, versus time offset alignment of the transmissions resulting in reception time alignment at the UE, in accordance with various aspects and implementations of the subject disclosure.

By way of an example, consider the upper graphical representations 220 of FIG. 2, in which time alignment at the transmitting cells (Tx signal cell 1 and Tx signal cell 2) results in time misalignment at the UE upon reception (Rx) of the received signal cell 1 relative to reception of the received signal cell 1. Such misalignment is generally due to the different propagation times from different radio units to the UE, corresponding to the difference between the distances R1 and R2 in the example of FIG. 1; (some amount of difference may be due to different clocks, however in TDD networks the expected time differences are relatively small).

As can be seen in the graphical representations 220, the received signal from cell 1 is received after a delay ΔT1, which is less than the delay ΔT2 after which the signal from cell 2 is received. This difference ΔT1–ΔT2, resulting in a negative time alignment equal to ΔT, is obtained (e.g., determined) by the time alignment logic 106.

Estimating the appropriate transmission time adjustment can be done in a number of ways. For example, UE positioning data (part of the existing standard) is available, and therefore the network can use the positioning information to estimate the propagation distance difference and accordingly the time. Further, the assisting cell can estimate the time offset based on the uplink sounding reference signal received from the UE. Assuming wide band reciprocity, a delayed uplink signal means the downlink signal needs to be advanced to achieve signal receiving alignment, and vice versa. It is also feasible for the UE to explicitly send the perceived time misalignment of a group of CSI-RS (channel state information reference signals) sent from the assisting cell. Any or all of these techniques, as well as others, can be combined as well.

As shown in the lower graphical representations 222 of FIG. 2, via time alignment, the transmission of Tx signal cell 2 occurs at a time ΔT before the transmission of Tx signal cell 2. As a result, the reception of the signal from cell 1 is basically received at the same time as reception of the received signal cell 2.

Figure 3A:
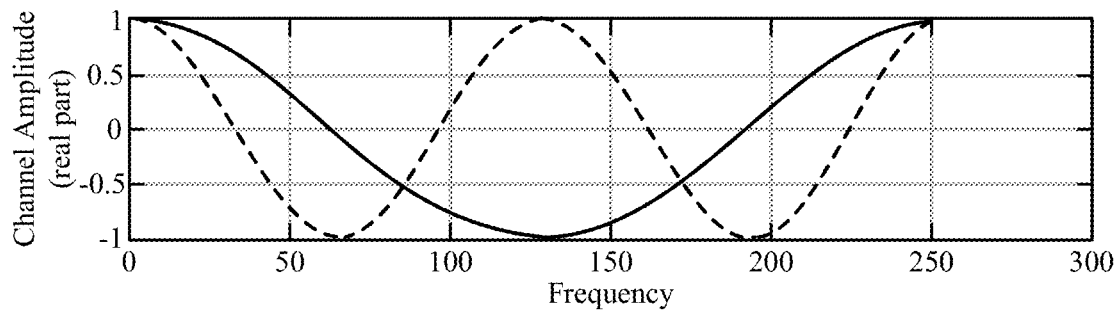
FIG. 3A is an example graphical representation of channel amplitude versus frequency for two delays of the same signal, in accordance with various aspects and implementations of the subject disclosure.
Figure 3B:
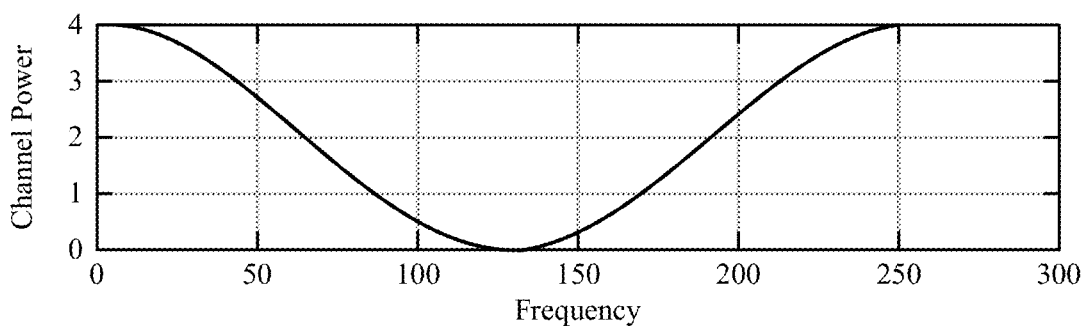
FIG. 3B is an example graphical representation of channel power versus frequency of two signals prior to activating time-aligned constructive interference, in accordance with various aspects and implementations of the subject disclosure.
Figure 3C:
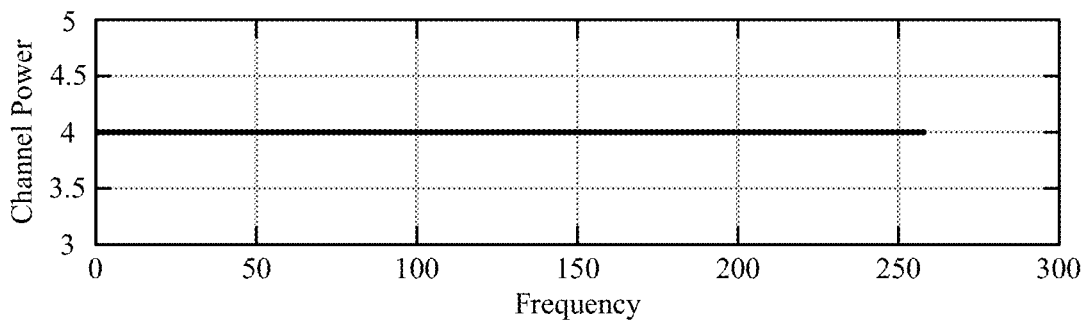
FIG. 3C is an example graphical representation of channel power versus frequency of two signals after activating time-aligned constructive interference, in accordance with various aspects and implementations of the subject disclosure.

This alignment of signal reception results in increased power because of constructive interference of the two signals. Note that without alignment, two signals are rotating at a different rate in the frequency domain, whereby as generally shown in FIG. 3A there is no one phase correction that can align the two signals to have a constructive interference. Although without alignment on average the power increases, e.g., by a factor of two (FIG. 3B, in which the power is dependent on frequency), that is less than when compared to a time-aligned constructive interference, which can increase the received power by a factor of four (for any frequency), as illustrated in FIG. 3C.

Turning to another aspect, which can be considered dynamic cooperation, in a next time interval (e.g., a defined number of slots or symbols) a cell can switch to serve one or more other selected UEs. For example, a time realignment can occur at cell #2 102(2). In other words, an assisting cell can change its downlink frame time boundary to achieve time alignment at the UE receiver as in FIG. 2, and then change it again. The assisting cell keeps its new downlink frame boundary for a period which could last a defined number of OFDM (orthogonal frequency-division multiplexing) symbols or slots. During that time the assisting cell is expected to only serve the UEs connected to the connected cell.

Subsequently, the assisting cell can return to its original DL frame time boundary, to provide service to its own connected UEs, or to transmit broadcast channels such as the synchronization signal blocks (SSB), CSI-RS and SIB1 (system information block 1). The assisting cell could toggle between those states repeatedly, (or alternate between more than two states) to provide different services in a time division multiplexing fashion. Note that unlike LTE or prior technologies, new radio (5G and beyond) cells can change their downlink times without affecting their connected UEs. This is because such cells are not mandated by the standard to send downlink signals outside some broadcast channels, which have a controllable periodicity (up to hundreds of milliseconds in some cases).

Figure 4:
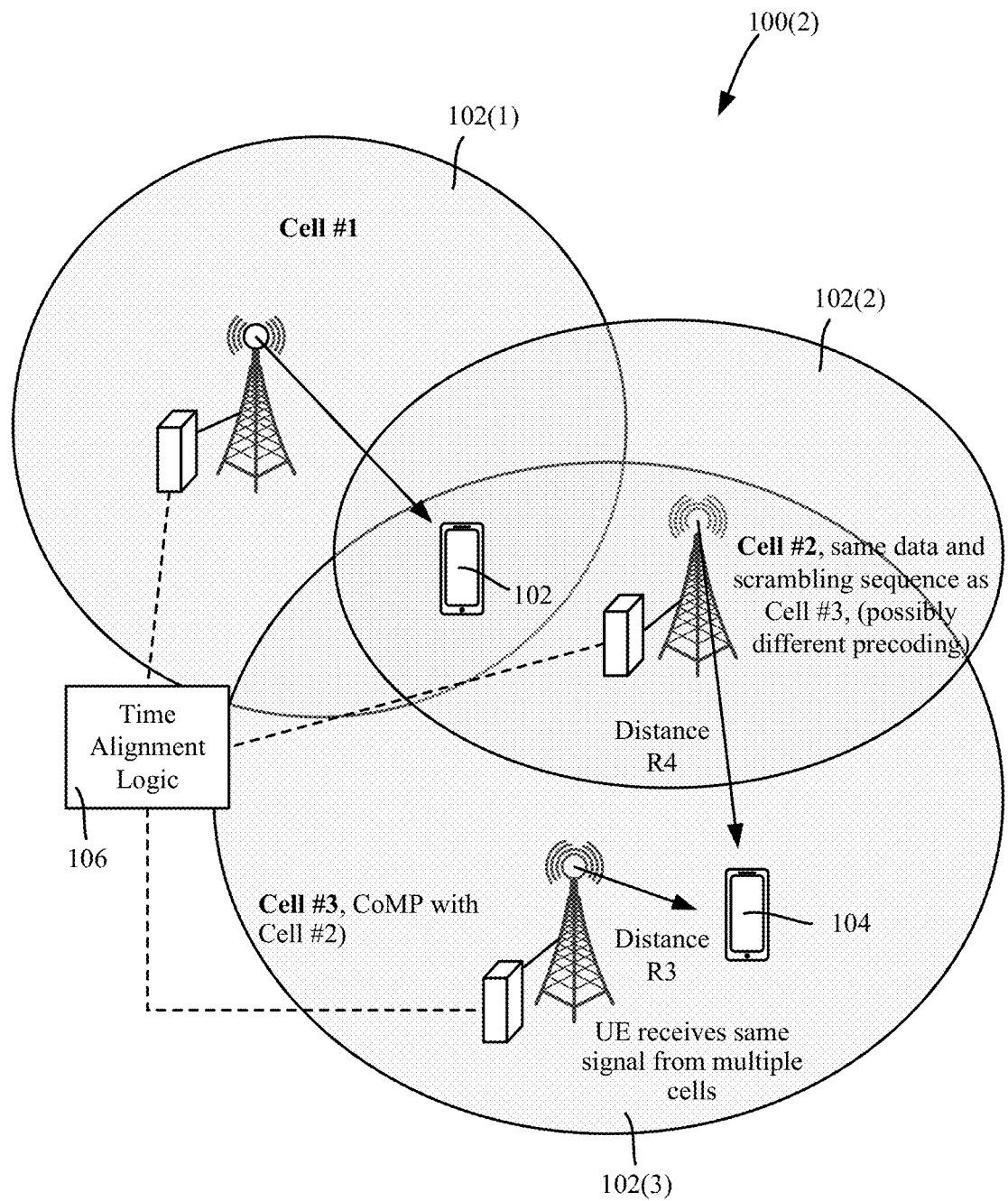
FIG. 4 depicts an example representation of multiple cells, including two cells serving a user equipment in a coordinated multipoint transmission/reception, showing dynamic cooperation where in a next time interval (e.g., slots or symbols), one cell switches to serve another selected UE, in accordance with various aspects and implementations of the subject disclosure.

Therefore, a cell can switch to assist another cell with downlink transmissions in the period between the transmission of those broadcasted channels. Indeed, as generally represented in FIG. 4, a cell such as the cell #2 102(2) can also change its scrambling sequence to assist a different cell, e.g., the cell #3 102(3), in providing COMP support to the UE 104. The difference of the distances R3 and R4 are used to redetermine a new time alignment offset for the cooperating cell cell #2 102(2). Note that a cell can thus alternate/multiplex between providing CoMP support to two different cells, as well as to broadcast on its broadcast channels and/or serving its own UEs.

Figure 5:
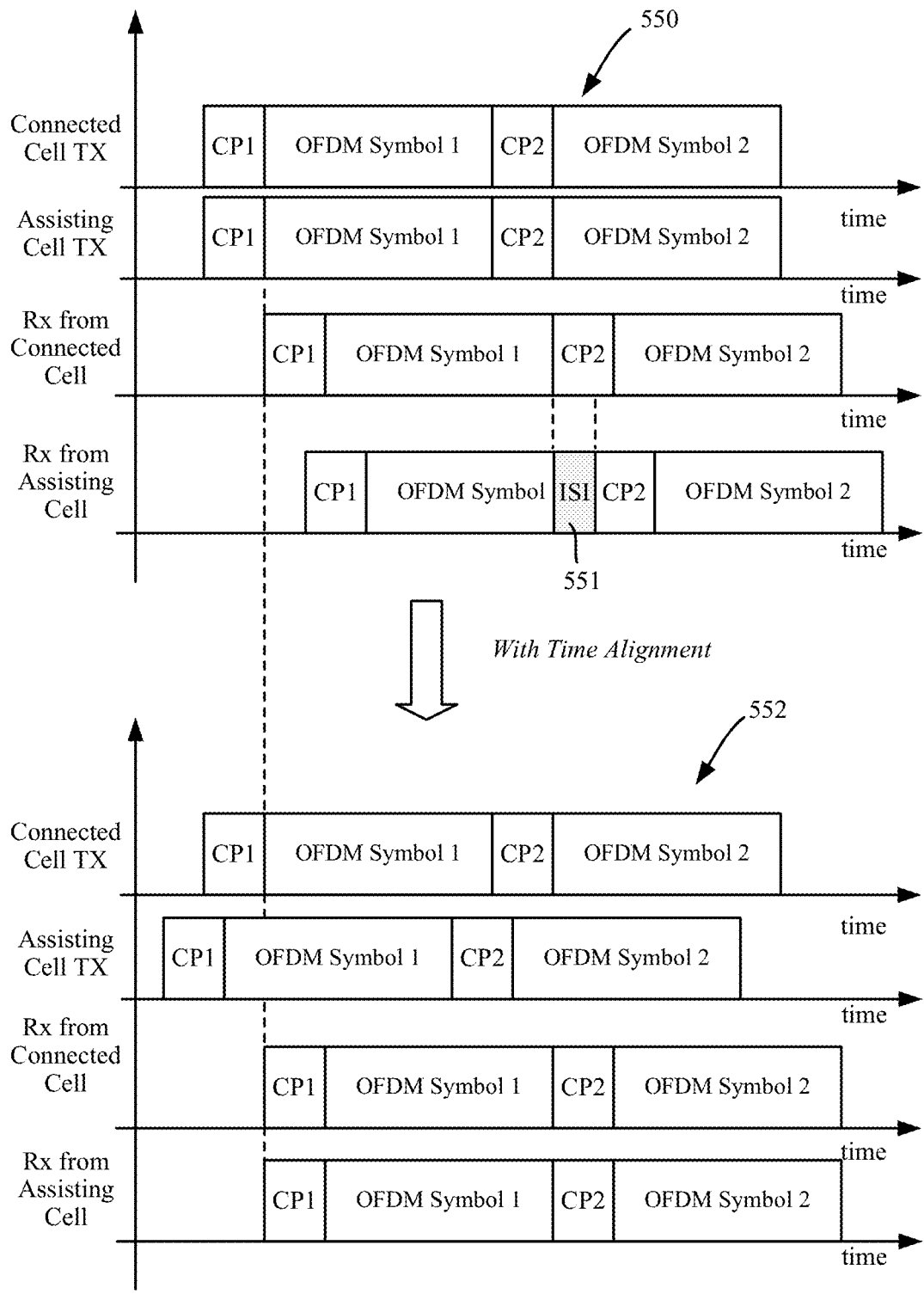
FIG. 5 shows example graphical representations of time alignment of transmissions resulting in inter-symbol interference, versus time offset alignment of the transmissions which eliminates inter-symbol interference, in accordance with various aspects and implementations of the subject disclosure.

As set forth above, it is possible that time misalignment can result in inter-symbol interference. For example, as shown in the upper graphical representations 550 of FIG. 5, in the event that the signals are received at the UE with a time misalignment larger than the CP duration, inter-symbol interference (ISI) results (as shown in the shaded block 551 timed between the CP2 of the subsequent reception from the connected cell and the OFDM symbols of the current reception from the assisting cell. With time alignment as shown in the lower graphical representations 552 of FIG. 5, such inter-symbol interference does not occur.

It should be noted that TDD adds restrictions with respect to implementations, however the technology described herein can comply with those restrictions. In particular, in TDD, downlink occasions should not overlap with uplink occasions and vice versa. Therefore, when switching from downlink to uplink, a guard period with no transmissions is required. That restriction is usually conformed to by the many cells of the network at the same time, to avoid interference.

In general, after the downlink adjustment according to the technology described herein, the TDD alignment experienced by the target UE (or group of UEs) actually improve compared to the normal operation of the network (i.e., without the alignment). However, for other UEs in other locations, issues may arise.

Figure 6:
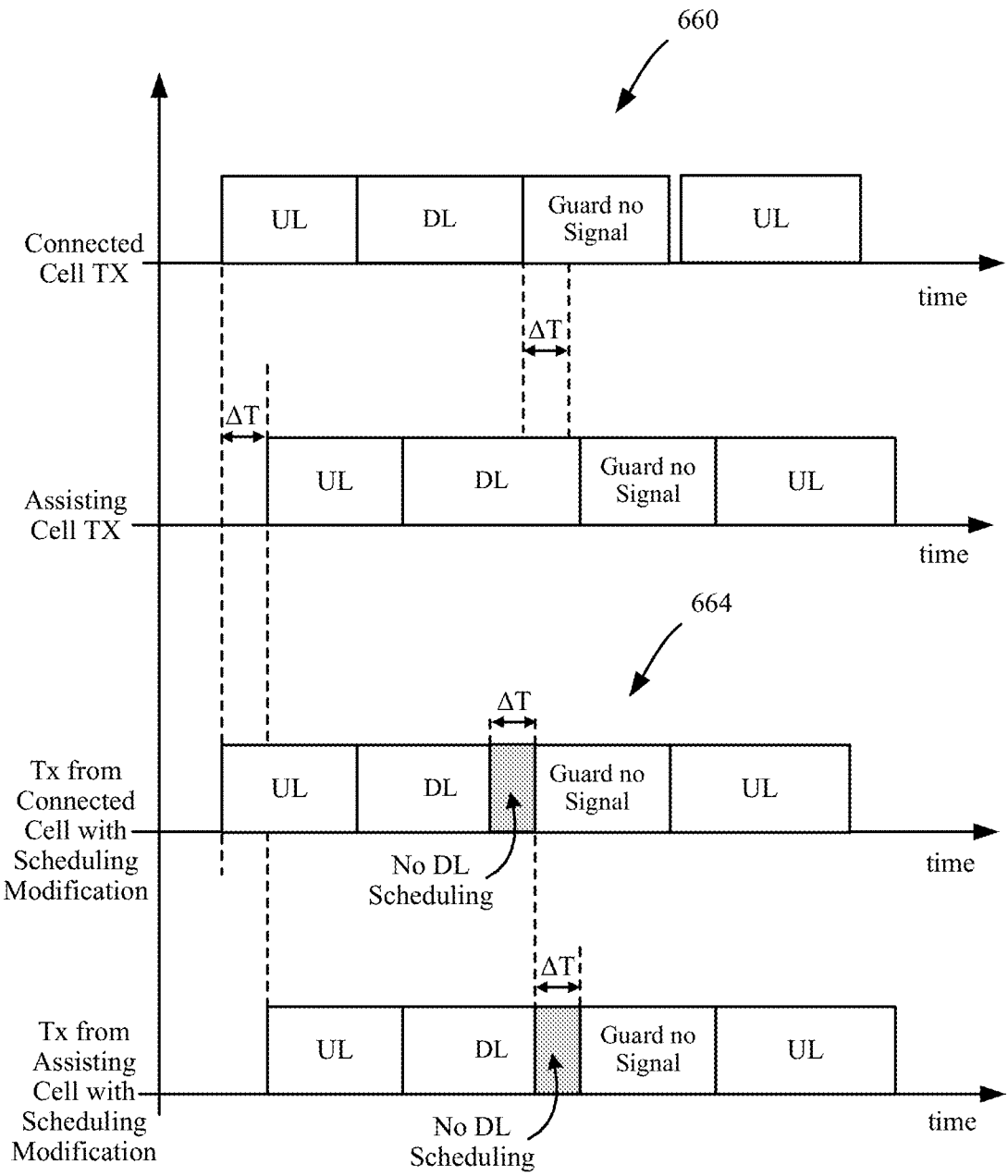
FIG. 6 shows example graphical representations of how positive offset time delay adjustment of one transmission can resulting in possible downlink/uplink interference, and can avoiding downlink/uplink interference by modifying downlink scheduling, in accordance with various aspects and implementations of the subject disclosure.

As shown in the upper portion graphical representations 660 of FIG. 6, as a result of a positive delay adjustment by the assisting cell, a downlink transmission of the assisting cell can overlap the guard period of the connected cell, which could violate the TDD restriction. That is, the time boundary of the resource element grid of the assisting cell might cause downlink-uplink interference.

To avoid such a scenario, the technology described herein increases the downlink-uplink gap by modifying the scheduling such that the symbol (or symbols in some scenarios) adjacent to the guard period are chosen for no downlink scheduling. As shown in the shaded blocks of the graphical representations 664 in the lower portion of FIG. 6, downlink symbols overlapping with the guard period due to the positive time adjustment are not scheduled. As a result, when time-aligned upon reception by the UE (not explicitly shown), there is no downlink data transmission during the guard period.

Similarly, in the case of negative delay adjustment (time advance) the scheduler can avoid using the first downlink symbol (or group symbols).

Note that the technology described herein is not limited to TDD, and is equally applicable to frequency division duplexing (FDD), where there is no inter-site interference due to time misalignment of downlink/uplink. Indeed, in the event TDD restrictions are unacceptable, the technology described herein is available and remains valid for FDD.

Figure 7:
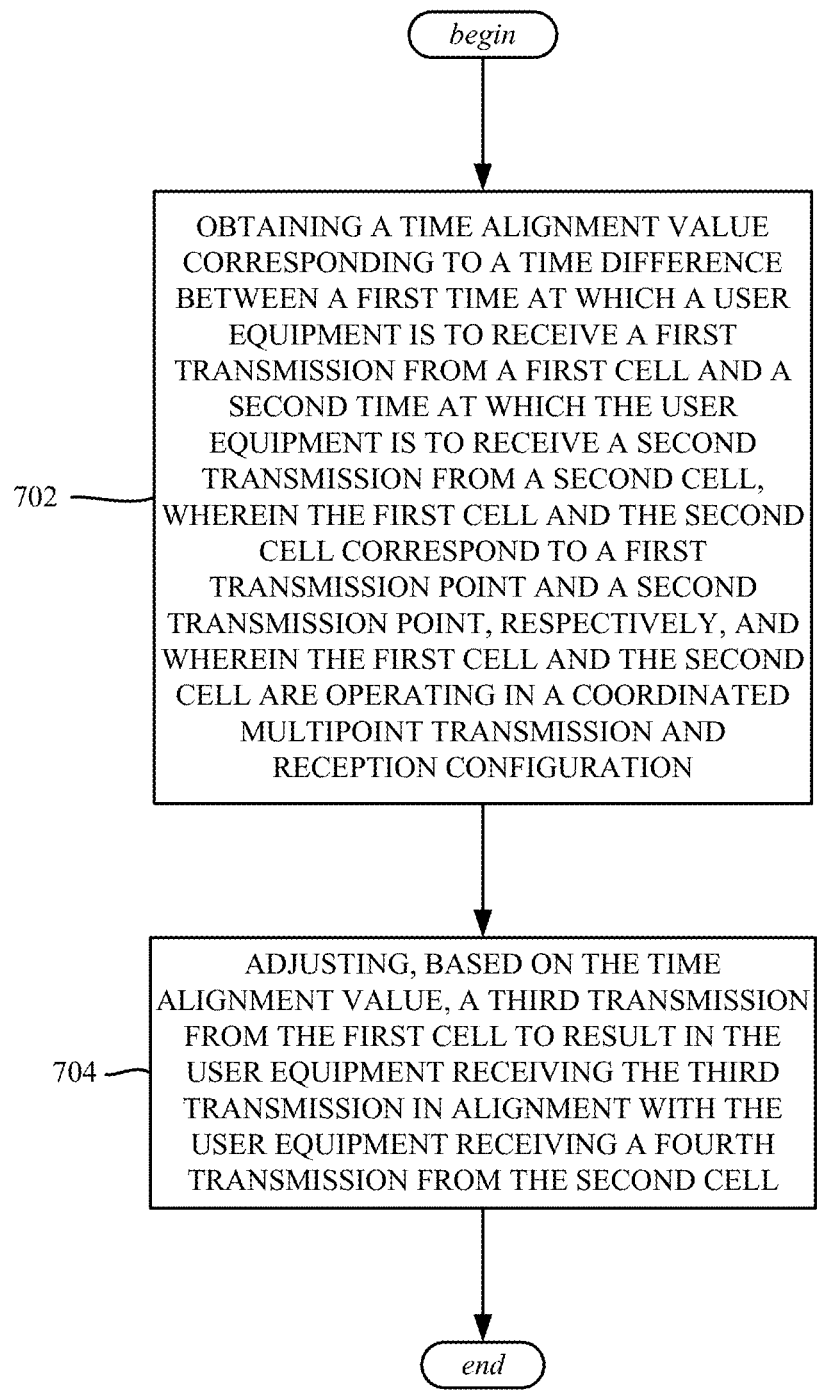
FIG. 7 is a flow diagram showing example operations related to adjusting a transmission time based on a time alignment value to result in user equipment receiving time-aligned downlink data from different cells, in accordance with various aspects and implementations of the subject disclosure.

One or more aspects can be embodied in a network device, such as represented in the example operations of FIG. 7, and for example can include a memory that stores computer executable components and/or operations, and a processor that executes computer executable components and/or operations stored in the memory. Example operations can include operation 702, which represents obtaining a time alignment value corresponding to a time difference between a first time at which a user equipment is to receive a first transmission from a first cell and a second time at which the user equipment is to receive a second transmission from a second cell, wherein the first cell and the second cell correspond to a first transmission point and a second transmission point, respectively, and wherein the first cell and the second cell are operating in a coordinated multipoint transmission and reception configuration. Example operation 704 represents adjusting, based on the time alignment value, a third transmission from the first cell to result in the user equipment receiving the third transmission in alignment with the user equipment receiving a fourth transmission from the second cell.

The first cell can be a connected cell and the second cell can be a cooperating cell. The first cell can be a cooperating cell and the second cell can be a connected cell.

Adjusting the third transmission can include changing a downlink frame boundary of the first cell. The downlink frame boundary can remain in use for a defined duration corresponding to a defined number of orthogonal frequency-division multiplexing symbols. The downlink frame boundary can be a first downlink frame boundary, and further operations can include returning to a second downlink frame boundary of the first cell at an end of the duration.

The downlink frame boundary can remain in use in use for a duration corresponding to a defined number of transmission slots. The downlink frame boundary can be a first downlink frame boundary, and further operations can include returning to a second downlink frame boundary of the first cell at an end of the duration.

The time alignment value can be a positive delay adjustment, and further operations can include modifying scheduling data to create a transmission gap adjacent to a guard period to avoid interference between a subsequent downlink transmission and a subsequent uplink transmission, subsequent to the modifying.

The time alignment value can be a negative delay adjustment, and further operations can include modifying scheduling data not to transmit for at least one downlink symbol to avoid interference with an uplink transmission.

Obtaining the time alignment value can include estimating a propagation distance difference value that is based on a first distance from the first cell to a position of the user equipment and on a second distance from the second cell to the position of the user equipment.

Obtaining the time alignment value can include estimating a time offset value based on a first uplink sounding reference signal received by the first cell from the user equipment and a second uplink sounding reference signal received by the second cell from the user equipment.

Obtaining the time alignment value can include receiving, from the user equipment, perceived time misalignment data based on channel state information reference signals sent from the second cell to the user equipment.

Figure 8:
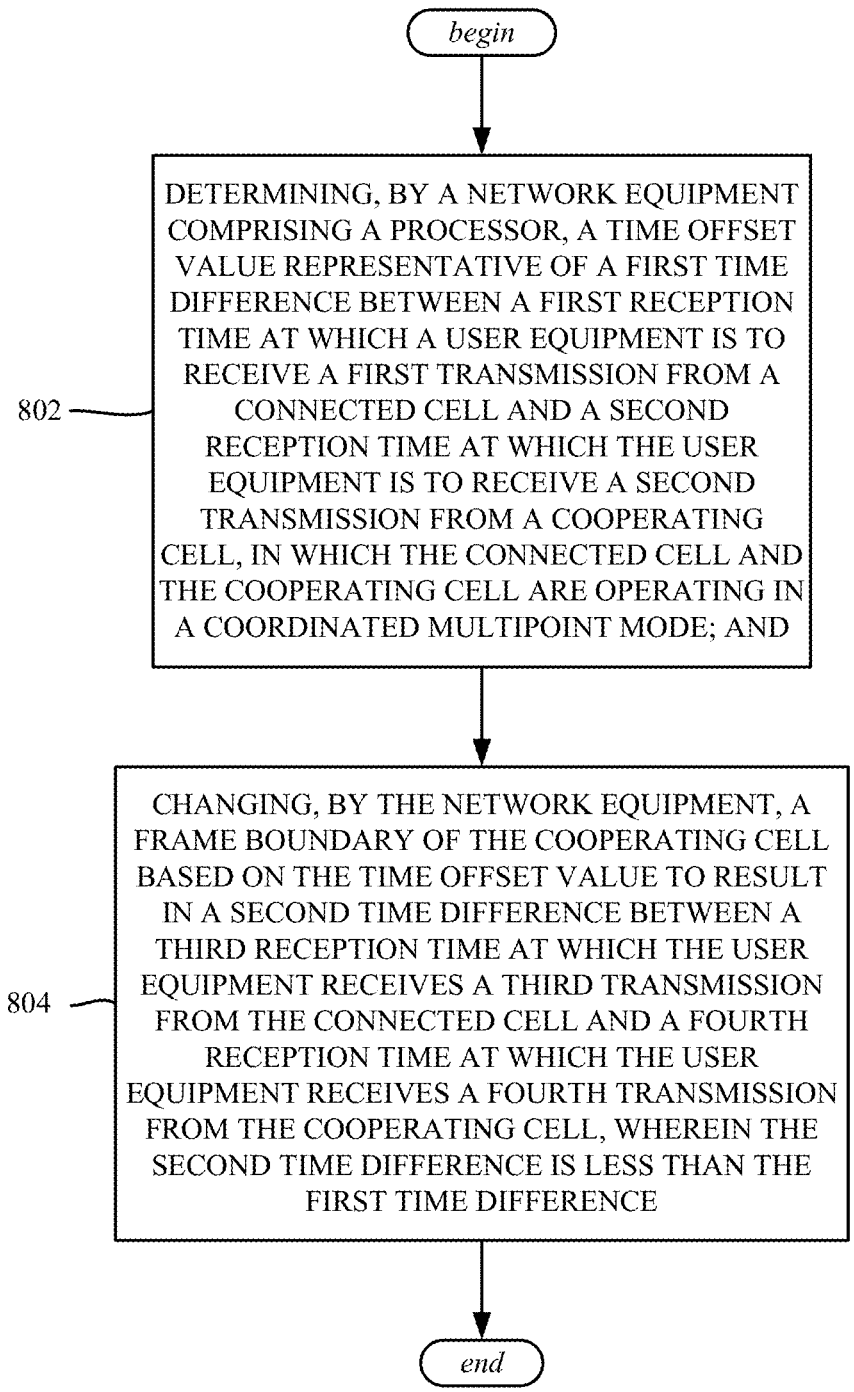
FIG. 8 is a flow diagram showing example operations related to changing a transmission frame boundary based on a time offset value to result in user equipment receiving time-aligned downlink data from different cells, in accordance with various aspects and implementations of the subject disclosure.

One or more example aspects, such as corresponding to example operations of a method, are represented in FIG. 8. Example operation 802 represents determining, by a network equipment comprising a processor, a time offset value representative of a first time difference between a first reception time at which a user equipment is to receive a first transmission from a connected cell and a second reception time at which the user equipment is to receive a second transmission from a cooperating cell, in which the connected cell and the cooperating cell are operating in a coordinated multipoint mode. Example operation 804 represents changing, by the network equipment, a frame boundary of the cooperating cell based on the time offset value to result in a second time difference between a third reception time at which the user equipment receives a third transmission from the connected cell and a fourth reception time at which the user equipment receives a fourth transmission from the cooperating cell, wherein the second time difference is less than the first time difference.

The time alignment value can include a positive delay adjustment that results in constructive interference of the third transmission and the fourth transmission as received by the user equipment, and further operations can include modifying, by the network equipment, scheduling data of the cooperating cell to create a transmission gap adjacent to a guard period to avoid interference between a subsequent downlink transmission and a subsequent uplink transmission, subsequent to the modifying.

The time alignment value can include a negative delay adjustment that results in constructive interference of the third transmission and the fourth transmission as received by the user equipment, and further operations can include modifying, by the network equipment, scheduling data of the cooperating cell not to transmit for at least one downlink symbol to avoid interference between a subsequent downlink transmission and a subsequent uplink transmission, subsequent to the modifying.

The user equipment can be a first user equipment, and further comprising resetting, by the network equipment after a duration, the frame boundary of the cooperating cell for subsequent communications with a second user equipment, subsequent to the resetting.

Figure 9:
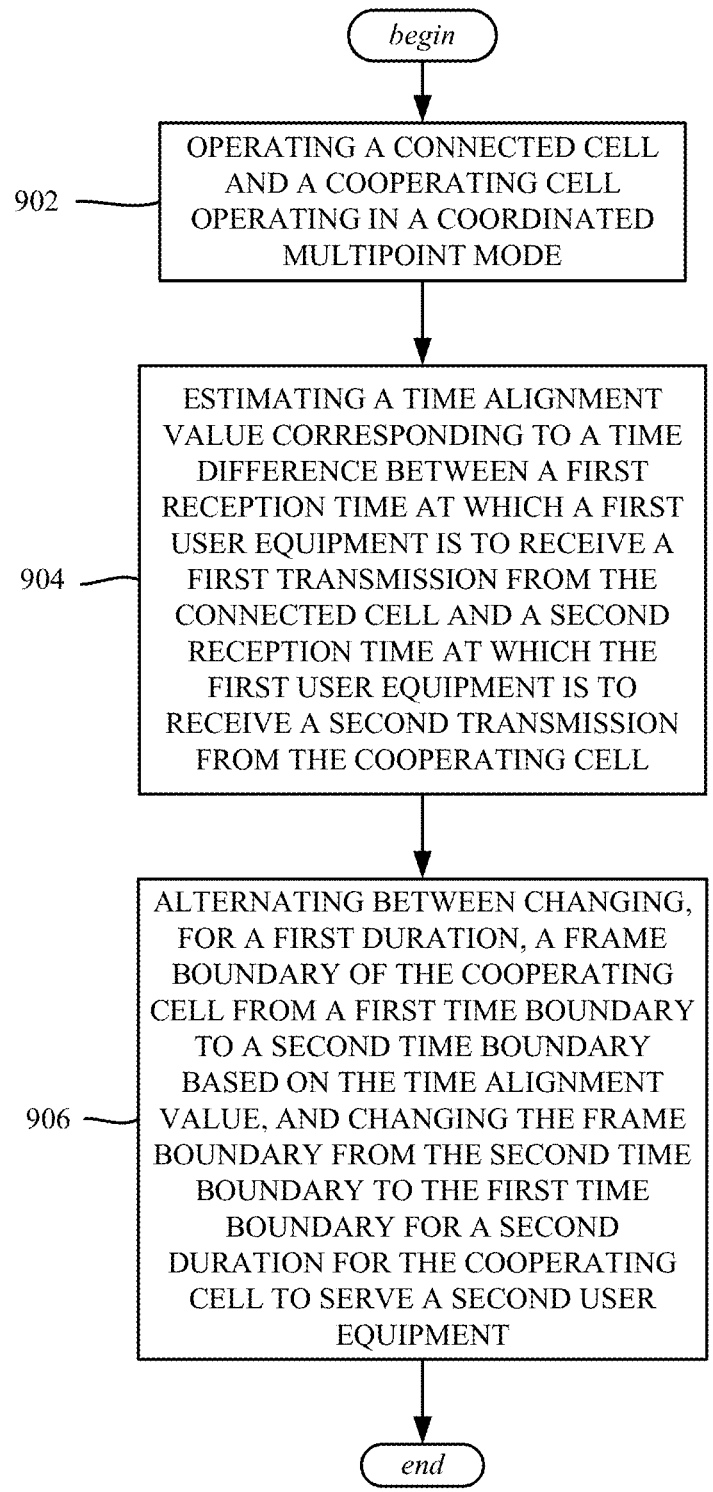
FIG. 9 is a flow diagram showing example operations related to alternating between changing frame boundaries of a cooperating cell to communicate with different user equipment devices, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents operating a connected cell and a cooperating cell operating in a coordinated multipoint mode. Example operation 904 represents estimating a time alignment value corresponding to a time difference between a first reception time at which a first user equipment is to receive a first transmission from the connected cell and a second reception time at which the first user equipment is to receive a second transmission from the cooperating cell. Example operation 906 represents alternating between changing, for a first duration, a frame boundary of the cooperating cell from a first time boundary to a second time boundary based on the time alignment value, and changing the frame boundary from the second time boundary to the first time boundary for a second duration for the cooperating cell to communicate with a second user equipment.

Estimating the time alignment value can include at least one of: determining a time offset value based on a propagation distance difference value based on a first distance from the first cell to a position of the first user equipment and a second distance from the second cell to the position of the first user equipment, or determining the time offset value based on first timing information corresponding to a first uplink sounding reference signal received by the first cell from the from the user equipment and second timing information corresponding to a second uplink sounding reference signal received by the second cell from the from the user equipment.

Further operations can include modifying scheduling data of the cooperating cell to avoid interference between a subsequent downlink transmission and a subsequent uplink transmission by the cooperating cell, subsequent to the modifying.

As can be seen, the technology described herein facilitates improved UE reception in COMP scenarios. The technology improves coverage/throughput of cells, and reduces radio unit power consumption, both at the UE side and the network side.

Figure 10:
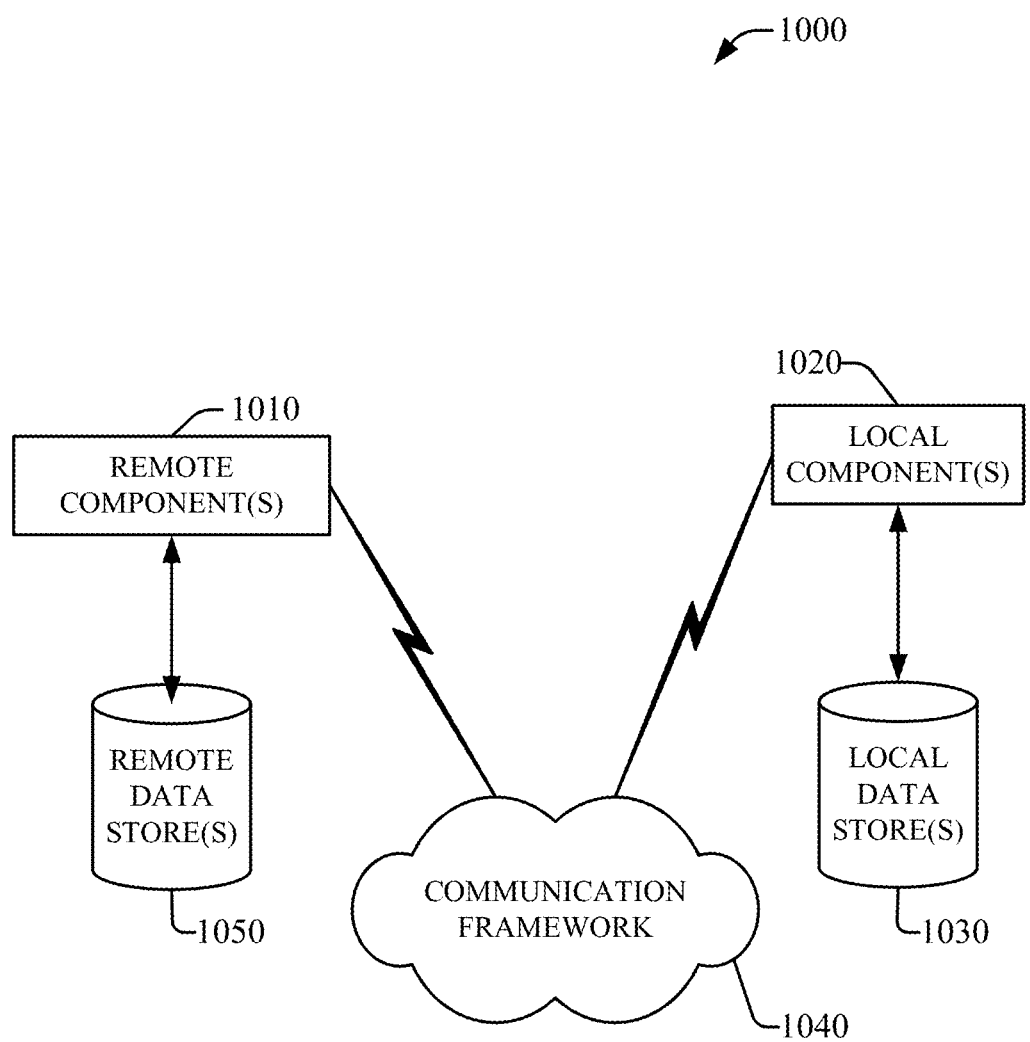
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
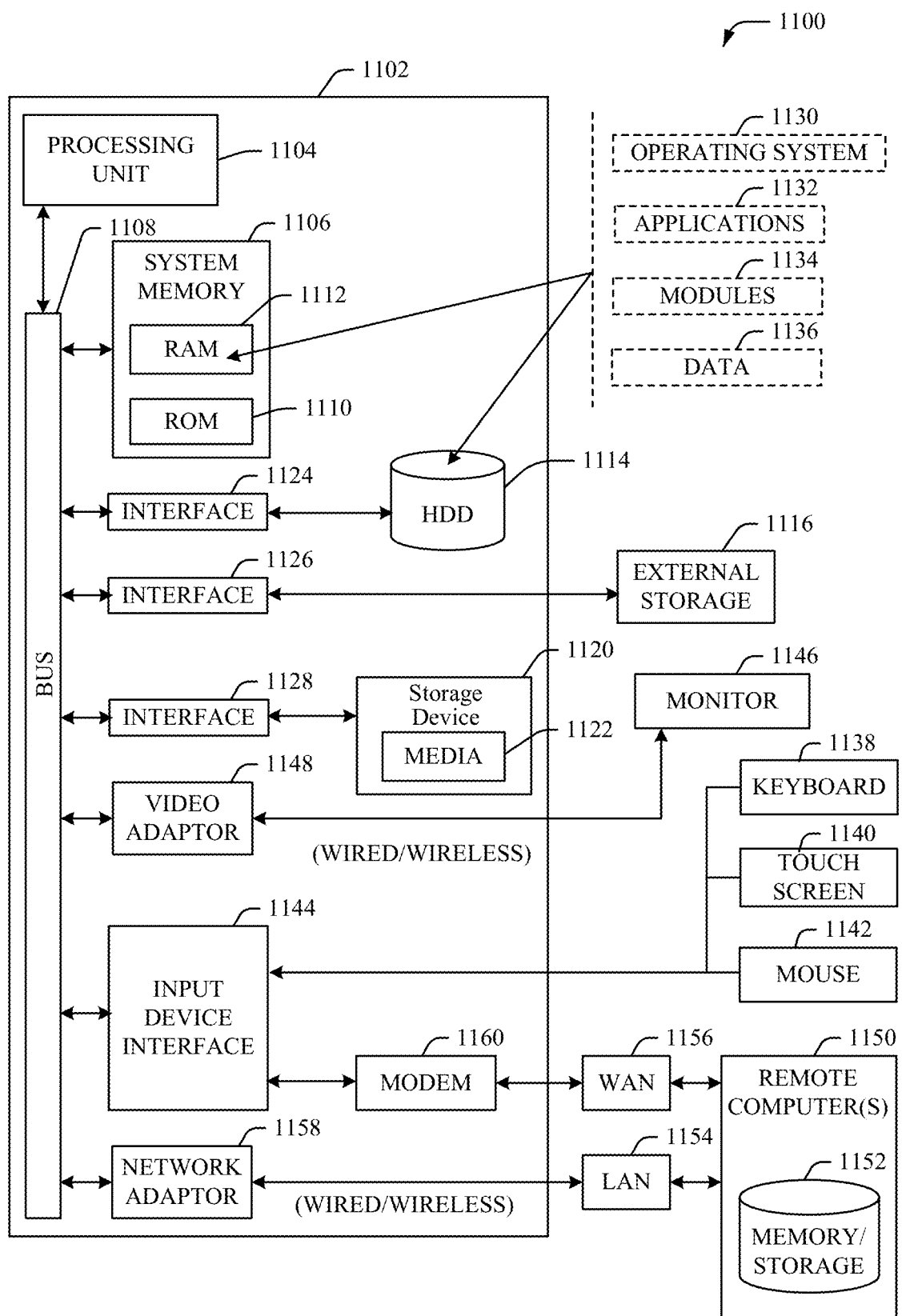
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
obtaining a time alignment value corresponding to a time difference between a first time at which a user equipment is to receive a first transmission from a first cell and a second time at which the user equipment is to receive a second transmission from a second cell, wherein the first cell and the second cell correspond to a first transmission point and a second transmission point, respectively, and wherein the first cell and the second cell are operating in a coordinated multipoint transmission and reception configuration; and
adjusting, based on the time alignment value, a third transmission from the first cell to result in the user equipment receiving the third transmission in alignment with the user equipment receiving a fourth transmission from the second cell,
wherein the adjusting of the third transmission comprises changing a downlink frame boundary of the first cell, and wherein the downlink frame boundary remains in use for a duration corresponding to a defined number of transmission slots.

2. The system of claim 1, wherein the first cell comprises a connected cell and the second cell comprises a cooperating cell.

3. The system of claim 1, wherein the first cell comprises a cooperating cell and the second cell comprises a connected cell.

4. The system of claim 1, wherein the downlink frame boundary remains in use for a defined duration corresponding to a defined number of orthogonal frequency-division multiplexing symbols.

5. The system of claim 4, wherein the downlink frame boundary is a first downlink frame boundary, and wherein the operations further comprise returning to a second downlink frame boundary of the first cell at an end of the duration.

6. The system of claim 1, wherein the downlink frame boundary is a first downlink frame boundary, and wherein the operations further comprise returning to a second downlink frame boundary of the first cell at an end of the duration.

7. The system of claim 1, wherein the time alignment value comprises a positive delay adjustment, and wherein the operations further comprise modifying scheduling data to create a transmission gap adjacent to a guard period to avoid interference between a subsequent downlink transmission and a subsequent uplink transmission, subsequent to the modifying.

8. The system of claim 1, wherein the time alignment value comprises a negative delay adjustment, and wherein the operations further comprise modifying scheduling data not to transmit for at least one downlink symbol to avoid interference with an uplink transmission.

9. The system of claim 1, and wherein the obtaining of the time alignment value comprises estimating a propagation distance difference value that is based on a first distance from the first cell to a position of the user equipment and on a second distance from the second cell to the position of the user equipment.

10. The system of claim 1, and wherein the obtaining of the time alignment value comprises estimating a time offset value based on a first uplink sounding reference signal received by the first cell from the user equipment and a second uplink sounding reference signal received by the second cell from the user equipment.

11. The system of claim 1, and wherein the obtaining of the time alignment value comprises receiving, from the user equipment, perceived time misalignment data based on channel state information reference signals sent from the second cell to the user equipment.

12. The system of claim 1, wherein the user equipment is a first user equipment, and wherein the operations further comprise:
resetting, after a duration, a frame boundary of the second cell for subsequent communications with a second user equipment, subsequent to the resetting.

13. A method, comprising:
determining, by a network equipment comprising at least one processor, a time offset value representative of a first time difference between a first reception time at which a first user equipment is to receive a first transmission from a connected cell and a second reception time at which the first user equipment is to receive a second transmission from a cooperating cell, in which the connected cell and the cooperating cell are operating in a coordinated multipoint mode;
changing, by the network equipment, a frame boundary of the cooperating cell based on the time offset value to result in a second time difference between a third reception time at which the first user equipment receives a third transmission from the connected cell and a fourth reception time at which the first user equipment receives a fourth transmission from the cooperating cell, wherein the second time difference is less than the first time difference; and
resetting, by the network equipment after a duration, the frame boundary of the cooperating cell for subsequent communications with a second user equipment, subsequent to the resetting.

14. The method of claim 13, wherein the time offset value comprises a positive delay adjustment that results in constructive interference of the third transmission and the fourth transmission as received by the first user equipment, and further comprising modifying, by the network equipment, scheduling data of the cooperating cell to create a transmission gap adjacent to a guard period to avoid interference between a subsequent downlink transmission and a subsequent uplink transmission, subsequent to the modifying.

15. The method of claim 13, wherein the time offset value comprises a negative delay adjustment that results in constructive interference of the third transmission and the fourth transmission as received by the first user equipment, and further comprising modifying, by the network equipment, scheduling data of the cooperating cell not to transmit for at least one downlink symbol to avoid interference between a subsequent downlink transmission and a subsequent uplink transmission, subsequent to the modifying.

16. The method of claim 13, wherein the adjusting of the third transmission comprises changing a downlink frame boundary of the connected cell.

17. The method of claim 16, wherein the downlink frame boundary remains in use for a duration corresponding to a defined number of transmission slots.

18. A non-transitory machine-readable medium, comprising executable instructions that, when executed by at least one processor, facilitate performance of operations, the operations comprising:
operating a connected cell and a cooperating cell operating in a coordinated multipoint mode;
estimating a time alignment value corresponding to a time difference between a first reception time at which a first user equipment is to receive a first transmission from the connected cell and a second reception time at which the first user equipment is to receive a second transmission from the cooperating cell; and
alternating between changing, for a first duration, a frame boundary of the cooperating cell from a first time boundary to a second time boundary based on the time alignment value, and changing the frame boundary from the second time boundary to the first time boundary for a second duration for the cooperating cell to communicate with a second user equipment.

19. The non-transitory machine-readable medium of claim 18, wherein the estimating of the time alignment value comprises at least one of: determining a time offset value based on a propagation distance difference value based on a first distance from the first connected cell to a position of the first user equipment and a second distance from the second cooperating cell to the position of the first user equipment, or determining the time offset value based on first timing information corresponding to a first uplink sounding reference signal received by the connected cell from the from the first user equipment and second timing information corresponding to a second uplink sounding reference signal received by the cooperating cell from the from the first user equipment.

20. The non-transitory machine-readable medium of claim 18, wherein the operations further comprise, modifying scheduling data of the cooperating cell to avoid interference between a subsequent downlink transmission and a subsequent uplink transmission by the cooperating cell, subsequent to the modifying.

* * * * *